United States Patent [19]
Bashaw et al.

[11] Patent Number: 6,023,355
[45] Date of Patent: *Feb. 8, 2000

[54] CODED-WAVELENGTH MULTIPLEX VOLUME HOLOGRAPHY

[75] Inventors: Matthew C. Bashaw, Stanford; John F. Heanue, San Mateo; Lambertus Hesselink, Woodside, all of Calif.

[73] Assignee: The Board of Trustees of the Leland Stanford Junior University, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/643,062

[22] Filed: Apr. 30, 1996

Related U.S. Application Data

[63] Continuation of application No. 08/643,062, Apr. 30, 1996, abandoned.

[51] Int. Cl.[7] .............................. G02B 5/32; G03H 1/10; G03H 1/22; G03H 1/28
[52] U.S. Cl. .................. 359/21; 359/3; 359/10; 359/24; 359/32; 365/216
[58] Field of Search ................. 359/10, 11, 21, 359/2, 28, 32, 33; 365/124, 125; 369/102, 103

[56] References Cited

U.S. PATENT DOCUMENTS

| | | | |
|---|---|---|---|
| 3,612,641 | 10/1971 | Eaglesfield | 359/11 |
| 5,121,231 | 6/1992 | Jenkins et al. | 359/10 |
| 5,422,873 | 6/1995 | Kewitsch et al. | 359/2 |
| 5,438,439 | 8/1995 | Mok et al. | 359/10 |
| 5,440,669 | 8/1995 | Rakuljic et al. | 359/7 |
| 5,510,912 | 4/1996 | Blaum et al. | 359/21 |
| 5,550,779 | 8/1996 | Burr et al. | 365/216 |
| 5,627,664 | 5/1997 | Trisnadi | 359/10 |
| 5,638,193 | 6/1997 | Trisnadi et al. | 359/10 |
| 5,696,613 | 12/1997 | Redfield et al. | 359/32 |

OTHER PUBLICATIONS

Rakuljic, G et al., Optical data storage by using orthogonal wavelength–multiplexed volume holograms, Optics Letter, 17(20), pp. 1471–1473, 1192.
Heanue, J. et al., Volume Holographic Storage and Retrieval of Digital Data, Science, 265, pp. 749–752, 1994.
Staebler, D. et al., Multiple storage and erasure of fixed holograms in Fe–doped LiNbO3, Appl. Phys. Letters, 26(4), pp. 182–184, 1975.
Mok, F., Angle–multiplexed storage of 5000 holograms in lithium niobate, Optics Letters, 18(11), pp. 915–917, 1993.
Psaltis, D. et al., Holography in artificial neutral networks, Nature, 343, pp. 325–330, 1990.
Bashaw et al., Cross–talk considerations for angular and phase–encoded multiplexing in volume holography, J. Opt. Soc. Am. B., 11(9), pp. 1820–1836, 1994.
Krasnov, A., Thick–film phase holograms recorded by means of coded reference waves, Sov. J. Quantum Electron, 7(9), pp. 1147–1148, 1977.

(List continued on next page.)

*Primary Examiner*—Audrey Chang
*Attorney, Agent, or Firm*—Lumen Intellectual Property Services

[57] ABSTRACT

A method for coded-wavelength multiplexing according to which a signal waves $S_i(r)$ is recorded in a holographic medium in a counter-propagating geometry using corresponding writing reference waves $R_i(r)$. The method involves selecting discrete wavelengths $\lambda$ and encoding reference wave vectors $\rho_l$ which make up writing reference waves $R_i(r)$ such that the writing reference waves $R_i(r)$ at each wavelength $\lambda$ are orthogonal. The stored signal waves $S_i(r)$ are reconstructed in the form of reconstruction waves $A_c(\sigma)$ with reconstruction reference waves $R_c(r)$ selected from among the writing reference waves $R_i(r)$. In the event of angular multiplexing of the reference wave vectors $\rho_l$, it is possible to use one reference wave to produce a number of reconstruction waves $A_c(\sigma)$ and generate a mosaic of desired holographic pages.

11 Claims, 6 Drawing Sheets

OTHER PUBLICATIONS

Hesselink, L. et al., Optical Memories implemented with photorefractive media, Optical and Quantum Electronics, 25, pp. S611–S661, 1993.

Curtis, K. et al., Cross talk in wavelength–multiplexed holographic memories, Optics Letters, 18(12), pp. 1001–1003, 1993.

Campbell, S. et al., Hybrid sparse–wavelength angle–multiplexed optical data storage system, Optics Letters, 19(24), pp. 2161–2163, 1994.

Denz, C. et al., Volume hologram multiplexing using a deterministic phase encoding method, Optics Communications, 85, pp. 171–176, 1991.

Denz, C. et al., Potentialities and limitations of hologram multiplexing by using the phase encoding technique, Appl. Optics, 31(26), pp. 5700–5705, 1992.

Taketomi, Y. et al., Incremental recording for photorefractive hologram multiplexing, Optics Letter, 16(22), pp. 1774–1776, 1991.

CODED-WAVELENGTH MULTIPLEX VOLUME HOLOGRAPHY

This application is a continuing application of application No. 08/643,062 filed Apr. 30, 1996, now abandoned.

This invention was made with U.S. Government support under Grant No. MDA972-94-2-0008 awarded by ARPA. The U.S. Government has certain rights in this invention.

BACKGROUND—FIELD OF THE INVENTION

The present invention relates to the field of holographic data storage, and in particular to a method for coded-wavelength multiplexing for storing and reconstructing signals in a holographic recording medium.

BACKGROUND—DESCRIPTION OF PRIOR ART

Volume holographic data storage and processing offer the potential for handling large quantities of data given the inherent high capacity of bulk media. Optical addressing ensures fast access times and the parallel nature of the medium translates into fast transfer rates. Capacity is governed by the numerical aperture of the signal, the number of holograms, or pages, the volume of the medium, and the acceptable level of cross talk and other noise sources.

It is well-known, that multiple holograms can be stored in the same volume using various encoding methods. Typically, in a volume Fourier holographic arrangement, these methods are based on angle, wavelength, or phase encoding. They can be practiced in either propagating or counter-propagating geometries. Thorough discussions of these arrangements can be found in the literature.

The efforts to store more holographic pages in a holographic recording medium are most often thwarted by increasing cross talk. Consequently, there is great interest in developing arrangements and methods for reducing this noise source. George A. Rakuljic et al. in their article entitled "Optical Data Storage by Using Orthogonal Wavelength-Multiplex Volume Holograms" appearing in Optics Letters, Oct. 15, 1992, Vol. 17, No. 20, pp. 1471-3 discuss how to reduce holographic cross talk in a simple wavelength multiplexed system. In particular, improved differentiation of wavelength-multiplexed holographic pages is predicted for a holographic system using counter-propagating signal and reference beams. The success of the method hinges on identifying proper regions in K-space, which is the space of hologram grating vectors representing stored data, where the necessary separation $\Delta k$, which is the change in wavelength or mismatch required to minimize cross talk between reconstructions of the desired holographic page and the adjacent holographic page, is minimum. Appropriate wavelength multiplexing can ensure this result when the information is distributed uniformly in K-space. This reduces cross talk in comparison to conventional arrangements relying on angular multiplexing and permits one to store more holographic pages.

Further improvements in holographic storage are desirable. In particular, it would be advantageous to increase the capacity of the constrained holographic system by increasing the number of pages which can be stored. Increased flexibility in the manner the holographic pages are stored and reconstructed would be advantageous in all applications, including: optical information storage, optical computing, neural networks, associative memory, and other uses. A multiplexing method which would satisfy these requirements would greatly enhance the potential of holography to gain widespread acceptance for data storage and processing.

OBJECTS AND ADVANTAGES OF THE INVENTION

In view of the above shortcomings of prior art, it is an object of the present invention to provide a method for practicing coded-wavelength multiplex holography in a counter-propagating geometry which enables the user to store an increased number of holographic pages in a holographic recording medium. Thus, the capacity of the holographic system is increased.

It is another object of the invention to provide a multiplexing method for holography which makes it possible to spatially separate the undesired cross talk from the reconstructed signal when practicing coded-wavelength multiplex holography in conjunction with angular multiplexing.

Yet another object of the invention is to adapt the method of the invention to permit the use of the cross talk signal for expanding the size of a holographic page in conjunction with angular multiplexing. This method will create a mosaic of holographic pages.

It is yet another object of the invention to ensure that the method can be practiced using simple and easy-to-control optical elements and systems.

These and other objects and advantages will become more apparent after consideration of the ensuing description and the accompanying drawings.

SUMMARY OF THE INVENTION

The objects and advantages of the invention are ensured by a unique method of multiplexing data in a holographic recording medium. This new technique is best described as coded-wavelength multiplexing and it is based on writing a signal wave $S_f(r)$ with a corresponding writing reference wave $R_f(r)$ in a counter-propagating geometry. The method involves the steps of selecting a wavelength $\lambda$ at which the signal wave $S_f(r)$ bearing either digital or analog information will be stored in the medium. The writing reference wave $R_f(r)$ is also set to this selected wavelength $\lambda$.

A first signal wave $S_1(r)$ having a spectrum of wave vectors represented by a representative signal wave vector $\sigma$ is then generated at wavelength $\lambda$. Also generated at wavelength $\lambda$ is a first writing reference wave $R_1(r)$. The first writing reference wave $R_1(r)$ has a number n of reference wave vectors $\rho_l$, where $l=1 \ldots n$ and n is at least 1. The first signal wave $S_1(r)$ is written or recorded in the holographic medium with the first writing reference wave $R_1(r)$ according to generally known principles of holography. A second signal wave $S_2(r)$ having the representative signal wave vector $\sigma$ and a second writing reference wave $R_2(r)$ are generated at the same frequency $\lambda$ to record the second signal $S_2(r)$ in the holographic medium. Again, second writing reference wave $R_2(r)$ is made up of a number m of reference wave vectors $\rho_l$, where $l=1 \ldots m$ and m is at least 1. The reference wave vectors $p_l$ for both the first writing reference wave $R_1(r)$ and for the second writing reference wave $R_2(r)$ are selected in such a way as to render these two waves orthogonal.

The orthogonality of the first and second writing reference waves is ensured by properly coding the reference wave vectors $\rho_l$. In particular, angular and phase-encoded multiplexing can be used to generate sets of reference wave vectors which produce orthogonal writing reference beams. In the event of angular multiplexing the number of reference wave vectors $\rho_l$ required for each writing reference beam is 1 (m=n=1). For phase-encoded multiplexing each writing reference beam will have at least two reference wave vectors $\rho_l$ (m≧2; n≧2). For practical reasons, it is preferable that number of reference wave vectors $\rho_l$ be the same for both writing reference waves (m=n). In phase-encoded multiplexing individual reference wave vectors $\rho_l$ are assigned different phases. Preferably, the reference wave vectors are assigned Walsh-Hadamard binary codes.

The stored first signal wave $S_1(r)$ is reconstructed or recalled with a reconstruction reference wave $R_c(r)$ selected from among the first and second writing reference waves. In the event of angular multiplexing of the reference wave vectors $\rho_l$ in the counter-propagating geometry it is possible to arrange a system to use either reference wave as the reconstruction reference wave $R_c(r)$ to reconstruct one or both signal waves. The reconstruction reference wave $R_c(r)$ produces a reconstruction wave $A_c(\sigma)$, which is projected on a detection mechanism or screen, such as an array of charge-coupled devices (CCDs) or the like. It is preferable that detection mechanism or screen have pixels if the data stored in the holographic medium is digital.

In a preferred embodiment the signal wave $S_i(r)$ has a limited field of view and the reference wave vectors $\rho_l$ are angle multiplexed. In this instance the method allows one to obtain a first reconstruction wave $A_1(\sigma)$ and a second reconstruction wave $A_2(\sigma)$ using only the first writing reference wave $R_1(r)$ as the reconstruction reference wave $R_c(r)$. In this arrangement the screen can have a spatial extent sufficient to intercept both reconstructed waves. In other words, the reconstructions of both signal waves can be viewed simultaneously. The location of one reconstruction does not overlap the other, thus there is no cross talk between data in the two reconstructions.

Of course, angular and phase-encoded multiplexing of the reference wave vectors $\rho_l$ can be implemented in the same arrangement. Also, the method of the invention can be extended in a straightforward manner to store and reconstruct any large number of signal waves $S_i(r)$. To do this the number of writing reference beams $R_i(r)$ can be larger than 2. Also, the same steps can be repeated at many wavelengths. In particular, it is preferable that λ be selected from a spectrum of discrete wavelengths.

Another particularly advantageous effect of the invention, when assigning different angles (angle coding) the reference wave vectors $p_l$ is the ability to generate a mosaic of reconstructed waves $A_c(\sigma)$. To do this the imaging screen has to be sufficiently large to intercept a select number or all reconstructions at a particular wavelength, e.g., $\lambda_1$. In practice, the mosaic concept presents a very attractive way of taking advantage of cross-talk reconstructions to view multiple holographic pages simultaneously.

The details of the invention are presented in the below description, which clarifies the various aspects of the invention in reference to the attached drawing figures.

DESCRIPTION

Figure 1:
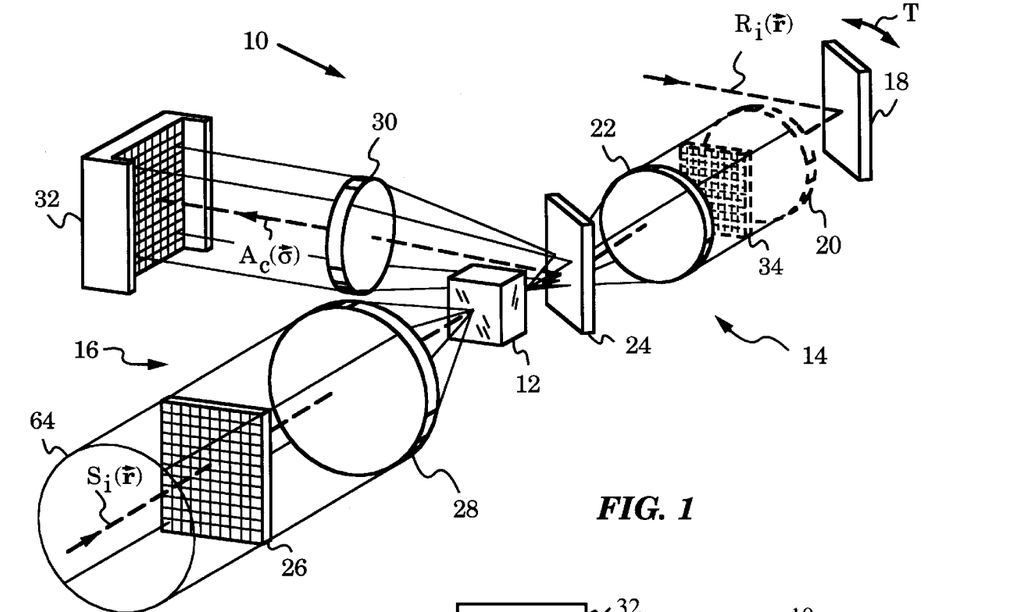
FIG. 1 is an isometric view showing a counter-propagating geometrical arrangement for practicing the method of the invention.

The method of the invention will be best understood by first reviewing the counter-propagating geometry as illustrated in FIG. 1. A holographic arrangement 10 has a holographic recording medium 12 centrally positioned between a reference beam arm 14 and a signal beam arm 16. Medium 12 can be made of any bulk holographic material or stratified holographic medium, which may be photorefractive or otherwise capable of preserving local changes of the index of refraction as a result of incident radiation.

In reference arm 14 a writing reference beam or wave $R_i(r)$ is shaped and guided by conventional optical elements. The optical elements include a deflector 18, a collimating lens 20 or a Phase Spatial Light Modulator 34 (PSLM), a Fourier or focusing lens 22, and a beam splitter or half-silvered mirror 24. Both lens 20 and PSLM 34 are drawn in dotted lines because the choice between them depends on whether angular or phase multiplexing will be practiced. As is well-known, no PSLM 34 is required for angular multiplexing and for phase multiplexing lens 20 is not necessary.

Deflector 18 has adjustable tilt for steering writing reference wave $R_i(r)$. This is indicated by arrow T. In particular, deflection of writing reference wave $R_i(r)$ changes the angle of incidence of wave $R_i(r)$ on medium 12 and allows for angular multiplexing, as explained below.

The mechanism for producing the tilt is not shown. In fact, any known method of deflecting writing reference wave $R_i(r)$ can be utilized by deflector 18, e.g., the electro-optic or acousto-optic effect. Collimating lens 20 shapes writing reference wave $R_i(r)$ and focusing lens 22 focuses it on medium 12.

A Phase Spatial Light Modulator 34 (PSLM) is positioned in the path of writing reference wave $R_i(r)$. PSLM 34 alters the phase of portions of reference wave vectors $\rho_l$, where l=1 . . . n, which make up writing reference wave $R_i(r)$. According to the theory of holographic storage, a reference beam can be regarded as a collection of plane waves. Each of these plane waves is designated by one reference wave vector $\rho_l$. In the absence of PSLM 34 reference wave $R_i(r)$ consists of only one plane wave and is thus described by one reference wave vector $\rho_1$, i.e., n=1. With PSLM 34 in place the maximum number n of reference wave vectors $\rho_l$ corresponds to the number of pixels of PSLM 34. In other words, each plane wave designated by reference wave vector $\rho_l$ is associated with a pixel of PSLM 34. Beam splitter 24 is used to filter out and direct out of reference arm 14 a reconstruction beam or wave $A_c(\sigma)$, as described below.

Holographic arrangement 10 is designed for operating with pages of holographic data. Consequently, signal beam arm 16 is equipped with a Spatial Light Modulator 26 (SLM) for producing holographic pages. As is well-known in the art, other elements for impressing data or any object to be stored in medium 12 can be placed at the location of SLM 26.

Signal wave $S_i(r)$ passes through SLM 26 and arrives at a focusing lens 28, which focuses it on medium 12. There wave $S_i(r)$ is stored with corresponding writing reference wave $R_i(r)$. Reconstruction of stored wave $S_i(r)$ is performed with a reconstruction reference wave $R_c(r)$. The latter can be the same as writing reference wave $R_i(r)$ with which wave $S_i(r)$ was originally stored, or, according to the present method, with a difference reference wave $R_i(r)$. This operation yields reconstruction wave $A_c(\sigma)$, which is deflected out of the reference beam arm 14 by beam splitter 24. A collimating lens 30 shapes reconstruction wave $A_c(\sigma)$ and projects it onto a detection unit, imaging screen or CCD 32. Any screen or device can be used to visualize, read, or record the data carried by reconstruction wave $A_c(\sigma)$.

Figure 2:
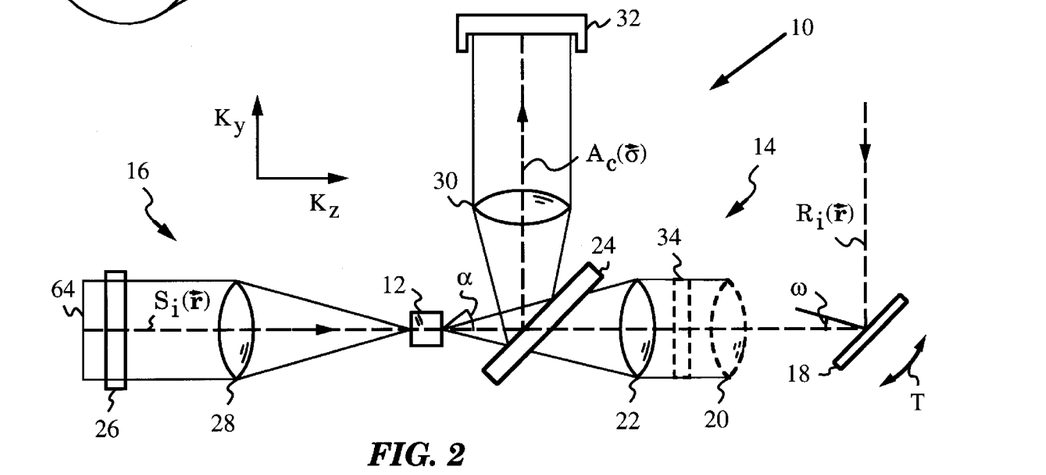
FIG. 2 is a top view of the arrangement of FIG. 1.

The top view in FIG. 2 better depicts arrangement 10 by indicating how reference wave $R_i(r)$ and signal wave $S_i(r)$ are shaped by the optical elements. Also, FIG. 2 illustrates how the operation of PSLM 34 and lens 20 (and deflector 18) are interchangeable. Changing a tilt angle $\omega$ of deflector 18 can redirect reference wave $R_i(r)$. Thus, deflector 18 permits the user to practice angular multiplexing. In this case only one plane wave front corresponding to one reference wave vector $p_l$ constitutes reference wave $R_i(r)$. Meanwhile, PSLM 34 can impart a different phase to portions of reference wave $R_i(r)$ thus creating corresponding reference wave vectors $\rho_l$ of wave $R_i(r)$. This enables one to perform phase multiplexing. Phase is practiced when PSLM 34 is used, and angle multiplexing requires lens 20 with deflector 18. In special cases, PSLM 34 by itself can act as a deflector by only allowing reference wave vectors $\rho_l$ of certain pixels to pass. This solution may be practical in some arrangements. The important aspect to practicing the method of the invention is that either angular, or phase, or both types of multiplexing be possible with arrangement 10. A person skilled in the art will be able to select the appropriate optical elements based on experience and the present disclosure.

As shown in FIG. 2, deflector 18 steers reference wave $R_i(r)$ over a steering angle $\omega$. Although in the figure $\omega$ only denotes the angular component in the y-z plane, it is understood that steering angle $\omega$ varies in three dimensional space. In fact, for the purposes of this discussion, all other angles used below are assumed to vary in three dimensions unless otherwise indicated. As expected, a change in steering angle $\omega$ causes reference wave $R_i(r)$ to impinge on medium 12 at an angle of incidence equal to steering angle $\omega$ (see FIG. 7). This will be explained in more detail below in discussing the preferred embodiment.

Focusing lens 22 converges reference wave $R_i(r)$ and directs it at medium 12. Analogously, lens 28 focuses signal wave $S_i(r)$ on a face of medium 12. Reconstructed wave $A_c(\sigma)$ is collimated by lens 30, after deflection out of reference arm 14 by beam splitter 24, and projected on imaging screen 32.

A particular wavelength $\lambda$ of light is first selected for reference wave $R_i(r)$ and signal wave $S_i(r)$. Once signal wave $S_i(r)$ is generated, wavelength $\lambda$ determines a representative signal wave vector $\sigma$ according to well-known physical principles ($|\sigma|=2\pi/\lambda$). It is understood that representative signal wave vector $\sigma$ represents a central or otherwise representative signal wave vector which stands for a continuous or discrete number of wave vectors actually constituting signal wave $S_i(r)$. Analogously, wavelength $\lambda$ dictates the magnitude of reference wave vectors $\rho_l$ making up reference wave $R_i(r)$. These vectors and their relationships are essential to the understanding of the invention.

To better analyze the situation, both reference wave $R_i(r)$ and signal wave $S_i(r)$ are Fourier transformed. In this manner their signal and reference wave vectors $\rho_l$ and $\sigma$ can be represented in the reciprocal space or K-space. By using the standard Fourier transformation one obtains the following complex amplitudes for waves $R_i(r)$ and $S_i(r)$:

$$S_i(r) = \int \hat{S}_i(\sigma) \exp(i\sigma \cdot r) d^3\sigma$$

$$R_i(r) = \Sigma_l R_{il} \exp(i\rho_l \cdot r).$$

Figure 3:
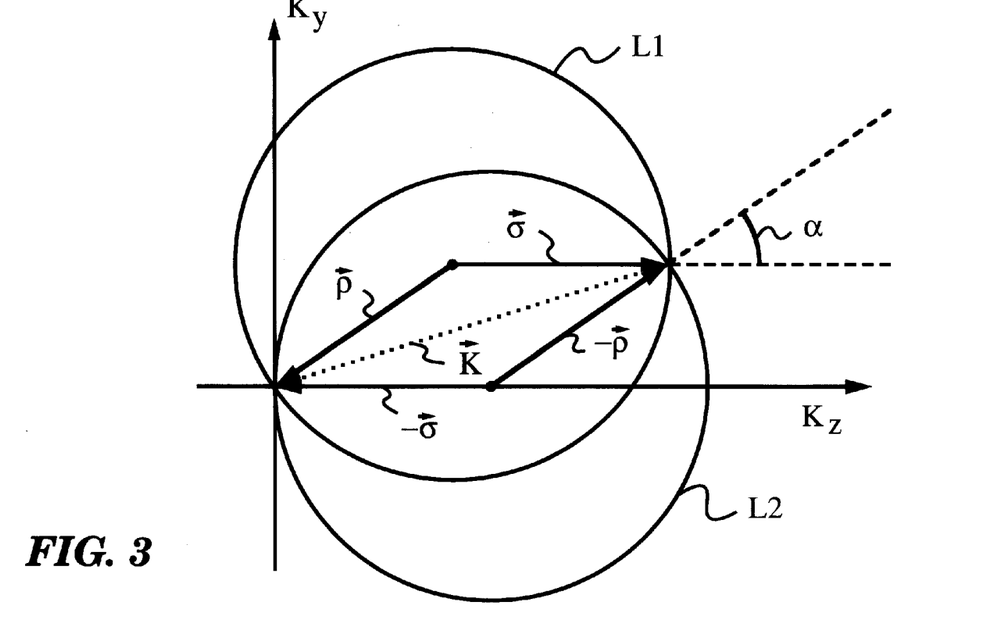
FIG. 3 is a diagram depicting wave vector degeneracy for angular coding of reference wave vectors $\rho_l$.

Thus, a two-dimensional reciprocal space can be defined as illustrated in FIG. 3. In this space signal wave $S_i(r)$ is represented by its signal wave vector $\sigma$ and reference wave $R_i(r)$ by its reference wave vector $\rho$. For simplicity, it is assumed that $n=1$ and thus only one reference wave vector $\rho_l = \rho$ makes up each reference wave (no phase-encoded multiplexing). For better understanding, the axes $K_y$ and $K_z$ correspond to those labeled in FIG. 2. The diagram shows the grating vector K written in medium 12 by signal wave vector $\sigma$ and reference wave vector $\rho$. In fact, the Ewald circle denoted by L1, is the locus of all grating vectors which can be written with reference wave vector $\rho$. In all cases, grating vector K is calculated from the equation:

$$K = \sigma - \rho$$

As illustrated, grating vector K produced by the pair of vectors $\sigma$ and $\rho$ can also be obtained with wave vectors $-\sigma$ and $-\rho$. In other words, wave vectors $\sigma$ and $\rho$ are degenerate to the wave vector pair $-\sigma$ and $-\rho$, since grating vector K belongs to locus L1 and locus L2 of all grating vectors which can be written using wave vector $-\sigma$ as the reference wave vector. This also means that signal wave vector $\sigma$ recorded with reference wave vector $\rho$ can be recalled using wave vector $-\sigma$ as an alternative reference wave vector.

When wave vector $-\sigma$ is used as the reference wave vector, however, wave vector $-\rho$ will also be reconstructed, if it was previously recorded. Therefore, in a situation where both vectors $\sigma$ and $-\rho$ have been recorded in medium 12, using reference wave vector $\rho$ and vector $-\sigma$ respectively, their reconstructions are generated simultaneously. In this case angle off incidence $\alpha$—equal to angle $\omega$—of reference wave vector $-\sigma$ used in writing wave vector $-\rho$ was equal to 0. Consequently, reconstructions of wave vectors $\sigma$ and $-\rho$ will emanate along the dotted lines offset from each other by angle of incidence $\alpha$.

Figure 4:
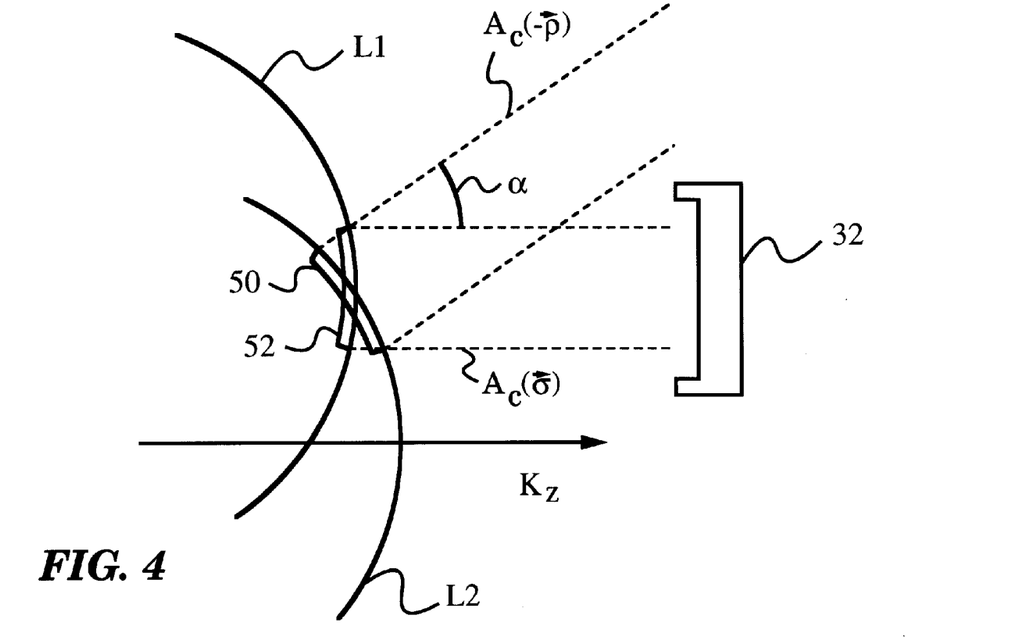
FIG. 4 is a diagram depicting the projection of two reconstructed signal beams having limited fields of view.

FIG. 4 affords a detailed view of reconstruction waves $A_c(\sigma)$ and $A_c(-\rho)$ corresponding to wave vectors $\sigma$ and $-\rho$. A grating spectrum 50 corresponding to wave vector $-\rho$ and a grating spectrum 52 corresponding to wave vector $\sigma$ are indicated on Ewald circles L1 and L2 respectively.

Grating spectra 50 and 52 are related to the fields of view of waves $A_c(\sigma)$ and $A_c(-\rho)$ and are quasi-Bragg matched. Under these circumstances, the field of view for wave $A_c(\sigma)$, for example, is governed by the condition that $\sigma + \delta\sigma$ has to yield $\Delta k_z = 2\pi/L$, where L is the characteristic interaction length of waves $R_i(r)$ and $S_i(r)$. Typically, the interaction length L is the smaller of the length of medium 12 or coherence length of the laser light used in waves $R_i(r)$ and $S_i(r)$.

In fact $\Delta k_z = 2\pi/L$ determines the first null at which all reconstruction will disappear. For all practical purposes the null position is construed as the outer limit or border of reconstruction wave $A_c(\sigma)$. Because of the symmetry of the problem, the field of view is equal to:

$$2 \times \delta\alpha_\sigma = \frac{2}{\alpha_\rho} \frac{\lambda}{L}.$$

The fields of view of reconstruction waves $A_c(\sigma)$ and $A_c(-\rho)$ are calculated using this equation. This is done to determine the minimum angle $\alpha\rho$ of reference wave vector $\rho$ directly related to angle $\omega$, which will ensure that reconstruction waves $A_c(\sigma)$ and $A_c(-\rho)$ are resolved on screen 32. In other words, to avoid overlap of reconstruction waves $A_c(\sigma)$ and $A_c(-\rho)$ the spatial extent of these reconstructions is calculated a priori and made sufficiently small to ensure that, propagating at an angular offset equal to angle of incidence $\alpha$, the projections of waves $A_c(\sigma)$ and $A_c(-\rho)$ do not overlap on screen 32. In FIG. 4 angle $\alpha$ is so large that reconstruction wave $A_c(-\rho)$ is not intercepted by screen 32 at all.

Technically, when viewing one of the reconstructed waves, e.g., wave $A_c(\sigma)$, the second wave, in this case $A_c(-\rho)$, represents cross talk. Thus, in accordance with the method of the invention, with the aid of angular multiplexing cross talk is spatially separated from the desired signal. This is visualized in FIG. 5 where the reconstructions wave $A_c(\sigma)$ is shown to project on screen 32 and undesired reconstruction wave $A_c(-\rho)$ misses screen 32. For example purposes, the information carried by waves $A_c(\sigma)$ and $A_c(-\rho)$ is assumed to be in digital form as indicated by the patterns. Of course, the information content and form can be entirely arbitrary.

Figure 5:
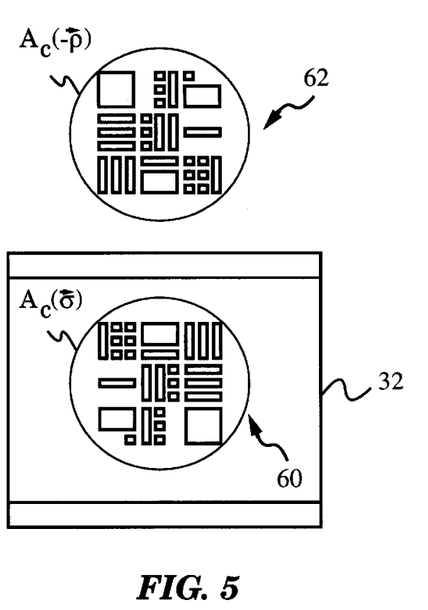
FIG. 5 is a front view of the imaging screen of FIG. 4.

Reconstruction waves $A_c(\sigma)$ and $A_c(-\rho)$ each have a limiting or finite field of view 60 and 62 imposed by the Bragg condition. Fields of view 60 and 62 are calculated as indicated above from angle $\alpha\rho$ and interaction length L. In practice, any intervening optical system, in this case collimating lens 30 of FIG. 1, placed in the path of waves $A_c(\sigma)$ and $A_c(-\rho)$ will affect the final size of fields of view 60 and 62. A person skilled in the art will be able to select proper system parameters to ensure that reconstructed beams 54 and 56 are resolved on screen 32.

Figure 6:
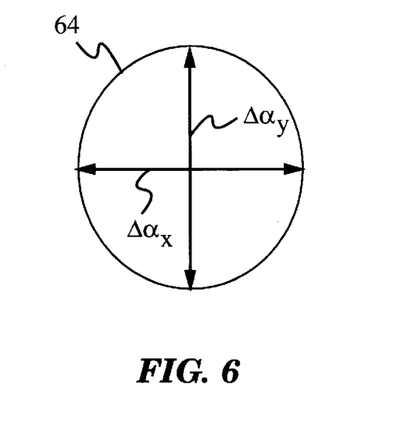
FIG. 6 is a diagram depicting the angular dimensions of a limited field of view of a signal beam.

In practice, the field of view is further limited by choice of reference wave vectors. In the case of FIG. 1 and FIG. 2 signal wave $S_i(r)$ has a field of view 64 defined in terms of angle of incidence a of reference wave $R_i(r)$ or its reference wave vector $\rho$. This is better shown in FIG. 6. In particular, $\Delta\alpha_x$ is the change along the x direction (into the page) of reference wave $R_i(r)$ between focusing lens 22 and medium 12. Similarly, $\Delta\alpha_y$ is the change which wave $R_i(r)$ experiences along the y direction (same as $K_y$) on the same path. The allowable field of view 64 can be adjusted by changing the components of angle $\alpha$. The general rule for selecting angles of the reference and signal wave vectors is a given direction can be stated as follows:

$$\Delta\theta_{92} \geq \Delta\theta_{94} = 2\ \Delta\theta_{phalf}.$$

Following the above directions one can determine proper angle of incidence $\alpha$ for a number of wave vectors $\rho_i$ constituting waves $R_i(r)$ so that reconstructed waves $A_c(\sigma)$ will not overlap on screen 32. Such waves $R_i(r)$ are defined to be orthogonal to each other.

In addition to angle multiplexing, wave vectors $\rho_i$ can also be phase multiplexed. This is done in the usual manner using PSLM 34. The phase codes of vectors $\rho_i$ for each reference wave $R_i(r)$ are selected such that waves $R_i(r)$ are orthogonal to each other. The Walsh-Hadamard binary phase codes are particularly suitable for this purpose. An in-depth discussion of these codes can be found in U.S. Pat. No. 3,612,641 issued to Eaglesfield.

PREFERRED EMBODIMENT

The preferred embodiment uses holographic arrangement 10 shown in FIGS. 1 and 2 and applies the above novel principle to a new method of coded-wavelength multiplexing in which wave vectors $\rho_i$ of individual waves $R_i(r)$ are angle-coded or angle multiplexed. To do this a particular wavelength $\lambda$ is first selected for waves $R_i(r)$ and $S_i(r)$. This wavelength determines the magnitude of the k-vectors.

Figure 7:
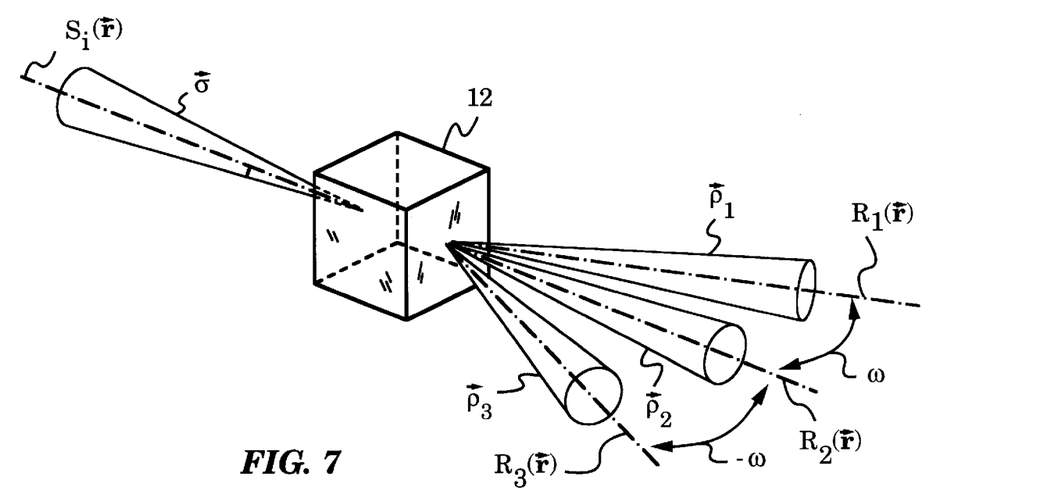
FIG. 7 is an isometric view illustrating coded reference wave vectors which have mutually orthogonal angles.

As an example of the preferred method, FIG. 7 shows three reference waves $R_1(r)$, $R_2(r)$ and $R_3(r)$ each consisting of a single wave vector $\rho$. The difference in angle between waves $R_1(r)$, $R_2(r)$ and $R_3(r)$ is equal to tilt angle $\omega$. Thus, waves $R_1(r)$, $R_2(r)$ and $R_3(r)$ are incident on medium 12 at angles $\alpha$, 0, and $-\sigma$. These angles have been calculated such that reconstructed waves $A_c(\sigma)$ of signals waves $S_i(r)$ will not overlap on screen 32. Thus, reference waves $R_1(r)$, $R_2(r)$ and $R_3(r)$ are mutually orthogonal.

Figure 8:
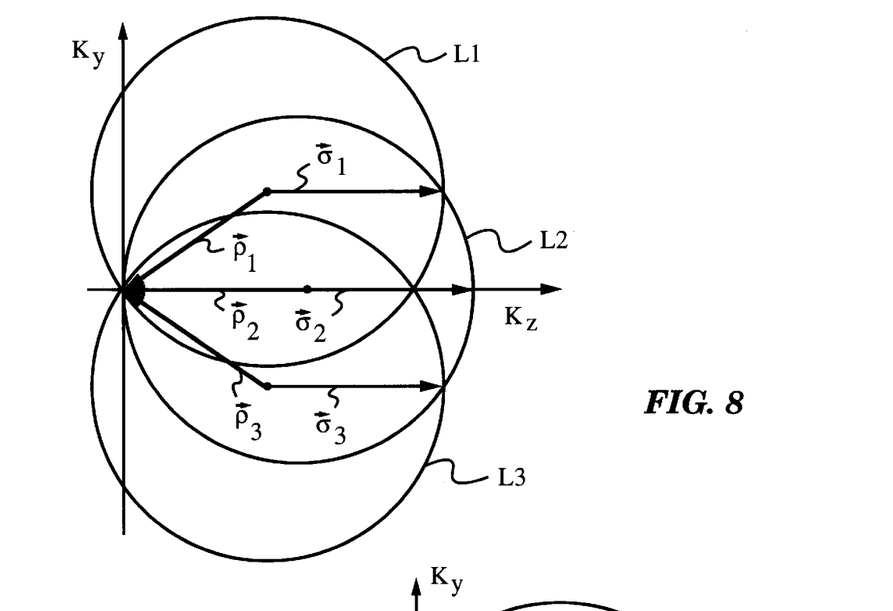
FIG. 8 is a diagram illustrating the recording of three signal waves $S_i(r)$.

In a first step signal wave $S_1(r)$ is written in medium 12 using writing reference wave $R_1(r)$. In a second step wave $S_2(r)$ is recorded with wave $R_2(r)$, and then wave $S_3(r)$ is stored with wave $R_3(r)$. FIG. 8 shows the recorded waves representing them by the corresponding wave vectors. Thus, signal waves $S_1(r)$, $S_2(r)$ and $S_3(r)$ are represented by corresponding to representative signal wave vectors $\sigma_1$, $\sigma_2$, $\sigma_3$, and writing reference waves $R_1(r)$, $R_2(r)$ and $R_3(r)$ are indicated by their corresponding reference wave vectors $\rho_1$, $\rho_2$, $\rho_3$.

Figure 9:
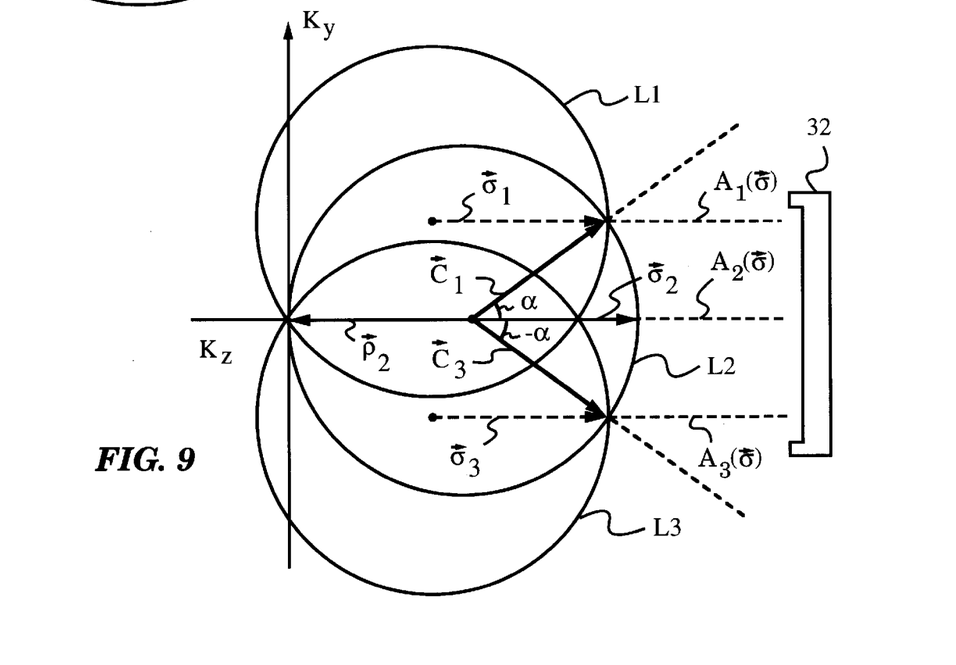
FIG. 9 is a diagram illustrating the reconstruction of the three signal beams recorded according to FIG. 8.

The reconstruction of all three signal waves $S_1(r)$ $S_2(r)$, $S_3(r)$ in this case can be performed with just one reconstruction wave $R_c(r)$ selected from among reference waves $R_1(r)$, $R_2(r)$ and $R_3(r)$. In this case $R_c(r)$ corresponds to $R_2(r)$, or $\rho_2$. This is illustrated in FIG. 9, where reconstructed waves $A_1(\sigma)$, $A_2(\sigma)$ and $A_3(\sigma)$ are shown propagating toward screen 32 along the dashed lines.

Cross talk represented by vectors $C_1$ and $C_3$ is also reconstructed by vector $\rho_2$. This is due to the degeneracy condition explained above. Fortunately, vectors $C_1$ and $C_3$ propagate at angles $\alpha$ and $-\alpha$. Thus, the cross talk signals diverge away from the desired reconstruction waves $A_1(\sigma)$, $A_2(\sigma)$ and $A_3(\sigma)$. In a particularly preferred embodiment the size of screen 32 and its orientation is set so that it intercepts the desired beams only, i.e., reconstruction waves $A_1(\sigma)$, $A_2(\sigma)$ and $A_3(\sigma)$.

An important feature of the above method of multiplexing according to the invention allows one to write a signal wave with one reference wave vector and reconstruct it with another. Thus, when practicing coded-wavelength multiplex holography in conjunction with angular multiplexing the undesired cross talk is shifted away from screen 32. In general, the method can be practiced in the counter-propagating geometry with any number of reference waves $R_i(r)$, where i=1 ... n and n is at least 2 ($n \geq 2$). Appropriate reconstruction waves $R_c(r)$ are chosen from among writing reference waves $R_i(r)$. In this manner many holographic pages can be stored at one particular wavelength $\lambda$, thereby increasing the storage capacity. Also, the method of the invention makes use of simple and easy-to-control optical elements and systems.

Arrangement 10 of FIG. 1 and FIG. 2 can be used in practicing the method of the invention at many distinct wavelengths $\lambda$. In other words, reference waves $R_i(r)$ can consist of sets of coded reference wave vectors $\rho_i$ with different k-vector magnitudes. Preferably, each wavelength $\lambda$ at which wavelength coded multiplexing is practiced is selected from a spectrum of discrete wavelengths. The wavelengths belonging to this spectrum should be sufficiently different to ensure a large Bragg mismatch between holograms multiplexed at each particular wavelength $\lambda$.

Figure 10:
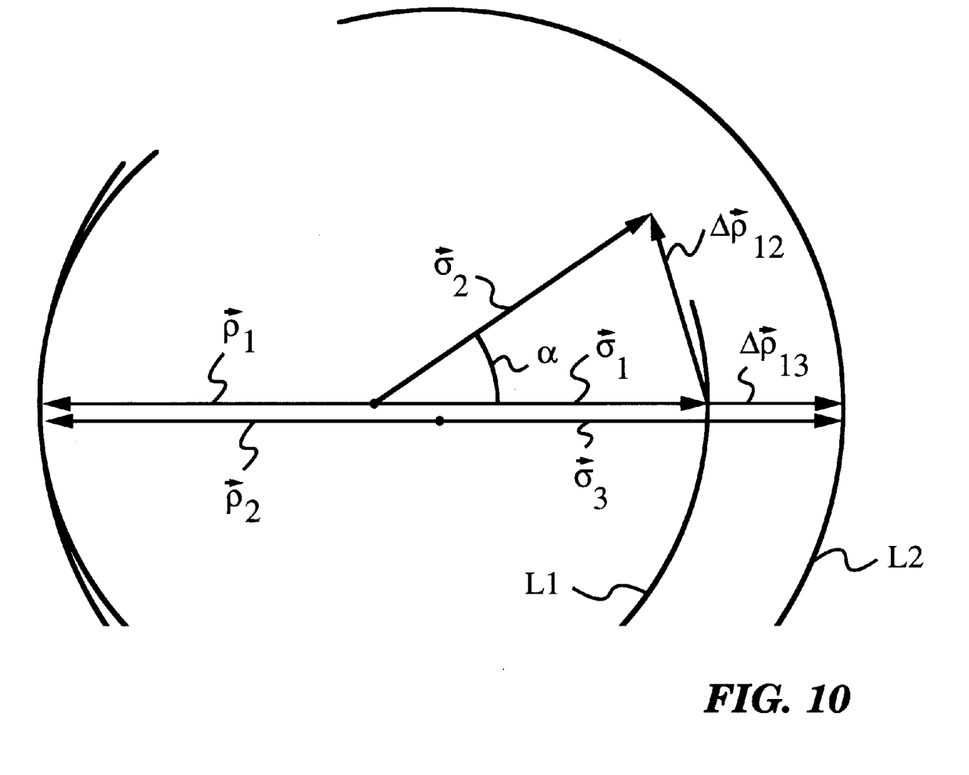
FIG. 10 is a diagram showing the dephasing parameter for angular coding of reference wave vectors $\rho_l$.

The choice of proper wavelength $\lambda$ will be better understood by referring to FIG. 10. This K-space diagram shows three different recorded signal wave vectors $\sigma_1$, $\sigma_2$, and $\sigma_3$. The first two have the same wavelength $\lambda_1$, and consequently the magnitude of their k-vectors is the same. Signal wave vectors $\sigma_1$, $\sigma_2$ and any other vector at wavelength $\lambda_1$, e.g., reference wave vector $\rho_1$, are thus described by locus L1. For angular coding, the difference between signal wave vectors $\sigma_1$, $\sigma_2$ is indicated by a dephasing or offset vector $\Delta\rho_{12}$. In should be noted that offset vector $\Delta\rho_{12}$ is nearly perpendicular to vector $\sigma_1$, and thus the dephasing parameter varies to second order with angle of incidence $\alpha$. Signal wave vector $\sigma_3$ has a shorter wavelength $\lambda_2$. As a result the magnitude of its k-vector is larger. The magnitude of the corresponding reference vector $\rho_2$ is equal to that of wave vector $\sigma_3$. For clarity, locus L2 delimits all vectors at wavelength $\lambda_2$. The dephasing or offset vector $\Delta\rho_{13}$ between signal wave vectors $\sigma_1$, $\sigma_3$ is collinear with vector $\sigma_1$ and varies to first order with wavelength. Thus, coded grating spectra recorded at wavelengths $\lambda_1$ and $\lambda_2$ will not overlap and cross talk is attenuated in the ordinary manner. In fact, when selecting a set of discrete wavelengths for coded-wavelength multiplexing the regular requirement for conventional wavelength multiplexing can be used. According to this criterion, defined in terms of frequencies rather than wavelengths, the selected frequencies should differ by:

$$\Delta f = c/2nL.$$

Figure 11:
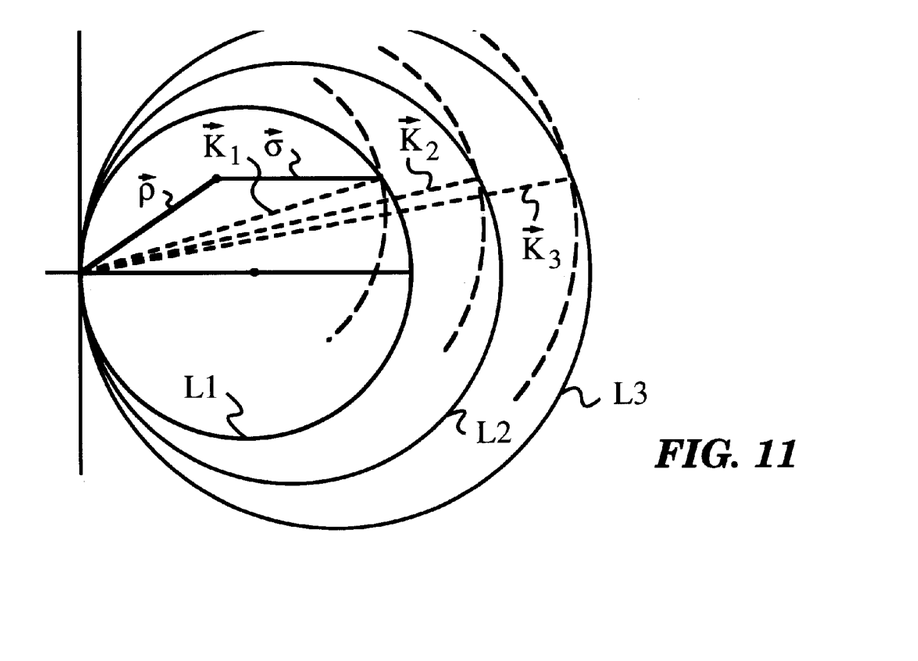
FIG. 11 is a diagram visualizing the dephasing condition for different wavelengths λ selected from a spectrum.

FIG. 11 illustrates grating vectors $K_1$, $K_2$, and $K_3$ recorded at the same angle of incidence $\alpha$ but at decreasing wavelengths corresponding to loci $L_1$, $L_2$, and $L_3$. Grating vectors $K_1$, $K_2$, and $K_3$ do not overlap and are therefore non-degenerate. This means that cross talk between their reconstructions is attenuated in the ordinary manner encountered in wavelength multiplexing.

Figure 12:
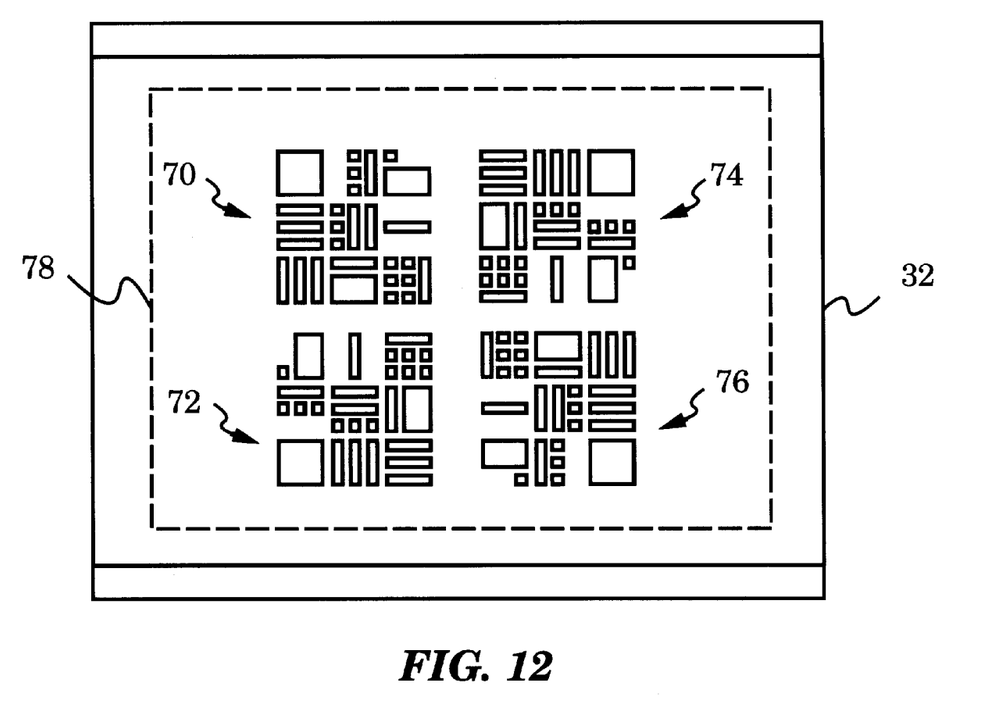
FIG. 12 is a view of a mosaic arrangement produced with the method according to the invention.

There is another advantage to coded-wavelength multiplexing in which reference wave vectors $\rho_l$ are angle-coded to ensure orthogonality of reference waves $R_l(r)$. This advantage has to do with the ability to project multiple reconstruction waves $A_c(\sigma)$ corresponding to independent holographic pages simultaneously (see FIG. 9). A pattern or mosaic 78 of the reconstructed holographic pages can be created on screen 32, as illustrated by FIG. 12.

For purposes of a practical example, arrangement 10 of FIG. 1 is used to produce mosaic 78 through angular encoding at wavelength $\lambda$. In this specific case, recording medium 12 is a 2 cm long sample of $LiNbO_3$. The source (not shown in drawing figures) for waves $R_l(r)$ and $S_l(r)$ was a dye laser pumped by an argon-ion laser operating at ≈615 nm with a linewidth of ≈100 GHz, which is substantially larger than the smallest spacing of 3 GHz permitted by wavelength selectivity in this sample. Screen 32 is a CCD camera. The focal length of lens 28 is ≈300 mm, and the image spans ≈5 mm, so that reference wave vectors $\rho_l$ are separated by ≈1°.

Four holographic pages 70, 72, 74, and 76 corresponding to four signal waves $S_l(r)$ are recorded in medium 12 using four incidence angles $\alpha_1$, $\alpha_2$, $\alpha_3$ and $\alpha_4$ at one wavelength $\lambda$. All four pages 70, 72, 74, and 76 are reconstructed by projecting their corresponding reconstruction waves $A_c(\sigma)$ on screen 32 simultaneously with just one reference wave $R_l(r)$ serving as the reconstruction reference wave $R_c(r)$. Although, in this case mosaic 78 includes only four pages, it may be larger and include any desired number of pages. The optimal shape of the mosaic and size will be determined the person skilled in the art in adapting the method of the invention to particular problems. It is understood that this example is intended to provide the user with a general idea about the parameters involved in practicing the method of the invention and in no way limits its scope.

In general, the method of the invention can be rigorously stated. The formalism takes into consideration all possible signal waves $S_l(r)$ with their signal wave vectors $\sigma$ and reference waves $R_l(r)$ with their coded reference wave vectors $\rho_l$. In the most general case the reconstruction amplitude can then be approximated by:

$$\hat{A}_c(\sigma_{19S}) = \Sigma_j \Sigma_l \Sigma_m R^*_{jl} R_{cm} B_{ml}(\sigma) S_j(\sigma \perp - \Delta\rho_{ml}\perp)$$

in which $$B_{ml}(\sigma) = C \exp[\xi_{ml}(\sigma)] \operatorname{sinc}[\xi_{ml}(\sigma)],$$

and $$\xi_{ml(\sigma)} \approx -\frac{L}{2}\left(\frac{\sigma \cdot \Delta\rho_{ml}}{\sigma_z} + \frac{\beta_m^2 - \beta_l^2}{2\sigma_z}\right).$$

In the above, $\operatorname{sinc}(x) = \sin(x)/x$, C governs the strength of the hologram. This function also defines the nulls in the reconstruction of a hologram. $\beta$ is the wave number in the medium, and $\Delta\rho_{ml} = \rho_m - \rho_l$. Because holograms can only be written with one wavelength $\lambda$ at a time, the reference codes necessarily have the property $R^*_{jl} R_{cm} = 0$ when $\beta_l \neq \beta_m$. For orthogonal reference codes, $\Sigma_l R^*_{jl} R_{cl} = 0$ when $i \neq c$, so that the sources of cross talk are Bragg mismatch reconstructions at $B_{ml}$. For angular encoding at each wavelength with wave vector $\rho_l$, the reference codes are given by $R_{il} = R_o \delta_{il}$. For phase encoding at each wavelength with wave vectors $\rho_l$ the orthogonality condition is determined by the phase codes (e.g., Walsh-Hadamard binary phase codes).

SUMMARY, RAMIFICATIONS, AND SCOPE

As evident from the above discussion, the present invention can be practiced in many ways. The essential feature is that orthogonal phase or angle codes be used for the individual reference wave vectors at every wavelength.

The mosaic concept can be implemented for faster data access or for computational purposes. This is particularly useful in the fields of optical computing, storage, and other related applications relying on holography.

Therefore, the scope of the invention should be determined, not by examples given, but by the appended claims and their legal equivalents.

We claim:

1. A method of holographically storing and retrieving information, said method comprising the following steps:
   a) generating a first signal wave $S_1$ characterized by a first signal wave vector $\sigma_1$,
   b) generating a first reference wave $R_1$ characterized by a first reference wave vector $\sigma_1$, wherein $\rho_1 = -\sigma_1$,
   c) illuminating a holographic medium with said first signal wave $S_1$ and said first reference wave $R_1$, thereby recording a first grating in said medium,
   d) generating a second signal wave $S_2$ characterized by a second signal wave vector $\sigma_2$, wherein $\sigma_2 = \sigma_1$,
   e) generating a second reference wave $R_2$ characterized by a second reference wave vector $\rho_2$, wherein said second reference wave vector $\rho_2$ makes an angle $\alpha$ with respect to said first reference wave vector $\rho_1$, f) illuminating said holographic medium with said second signal wave $S_2$ and said second reference wave $R_2$, thereby recording a second grating in said medium, g) generating a third signal wave $S_3$ characterized by a third signal wave vector $\sigma_3$, wherein $\sigma_3=\sigma_1$, h) generating a third reference wave $R_3$ characterized by a third reference wave vector $\rho_3$, wherein said third reference wave vector $\rho_3$ makes an angle $\beta$ with respect to said first reference wave vector $\rho_1$, wherein said first, second, and third reference wave vectors $\rho_1$, $\rho_2$, and $\rho_3$ are not coplanar, and wherein said waves $S_1$, $S_2$, $S_3$, $R_1$, $R_2$, and $R_3$ have the same wavelength, i) illuminating said holographic medium with said third signal wave $S_3$ and said third reference wave $R_3$, thereby recording a third grating in said medium, j) illuminating said holographic medium with said first reference wave $R_1$, thereby generating first, second, and third reconstructed waves characterized by first, second, and third reconstructed wave vectors, respectively, wherein said first reconstructed wave vector is equal to said first signal wave vector $\sigma_1$, said second reconstructed wave vector is equal to the negative of said second reference wave vector $\rho_2$, and said third reconstructed wave vector is equal to the negative of said third reference wave vector $\rho_3$.

2. The method of claim 1, further comprising the step of projecting said first, second and third reconstructed waves on an imaging means.

3. The method of claim 2, wherein said angles $\alpha$ and $\beta$ are selected so that said first, second, and third reconstructed waves do not overlap on said imaging means.

4. The method of claim 1, further comprising the step of projecting said first reconstructed wave on an imaging means, and wherein said angle $\alpha$ is selected so that said second reconstructed wave does not intercept said imaging means.

5. The method of claim 1, wherein said first, second, and third signal waves $S_1$, $S_2$ and $S_3$ are impressed with digital data.

6. The method of claim 1, wherein said first, second, and third signal waves $S_1$, $S_2$, and $S_3$ are impressed with analog data.

7. A method of holographically storing and retrieving information, said method comprising the following steps:

a) generating a first signal wave $S_1$ characterized by:
  (i) a first signal wave vector $\sigma_1$, and
  (ii) an angular spread $\theta$, b) generating a first reference wave $R_1$ characterized by a first reference wave vector $\rho_1$, wherein $\rho_1=-\sigma_1$, c) illuminating a holographic medium with said first signal wave $S_1$ and said first reference wave $R_1$, thereby recording a first grating in said medium, d) generating a second signal wave $S_2$ characterized by a second signal wave vector $\sigma_2$, wherein $\sigma_2=\sigma_1$, e) generating a second reference wave $R_2$ characterized by a second reference wave vector $\rho_2$, wherein said second reference wave vector $\rho_2$ makes an angle $\alpha$ with respect to said first reference wave vector $\rho_1$, f) illuminating said holographic medium with said second signal wave $S_2$ and said second reference wave $R_2$, thereby recording a second grating in said medium, g) generating a third signal wave $S_3$ characterized by a third signal wave vector $\sigma_3$, wherein $\sigma_3=\sigma_1$, h) generating a third reference wave $R_3$ characterized by a third reference wave vector $\rho_3$, wherein said third reference wave vector $\rho_3$ makes an angle $\beta$ with respect to said first reference wave vector $\rho_1$, wherein said angles $\alpha$ and $\beta$ are greater than said angular spread $\theta$; wherein said first, second, and third reference wave vectors $\rho_1$, $\rho_2$, and $\rho_3$ are not coplanar; and wherein said waves $S_1$, $S_2$, $S_3$, $R_1$, $R_2$, and $R_3$ have the same wavelength, i) illuminating said holographic medium with said third signal wave $S_3$ and said third reference wave $R_3$, thereby recording a third grating in said medium, j) illuminating said holographic medium with said first reference wave $R_1$, thereby generating first, second, and third reconstructed waves characterized by first, second, and third reconstructed wave vectors, respectively, wherein said first reconstructed wave vector is equal to said first signal wave vector $\sigma_1$, said second reconstructed wave vector is equal to the negative of said second reference wave vector $\rho_2$, and said third reconstructed wave vector is equal to the negative of said third reference wave vector $\rho_3$.

8. The method of claim 7, further comprising the step of projecting said first, second and third reconstructed waves on an imaging means.

9. The method of claim 7, further comprising the following steps:

a) projecting said first reconstructed wave onto an imaging means, and b) positioning said imaging means so that said second reconstructed wave does not intercept said imaging means.

10. The method of claim 7, wherein said first, second, and third signal waves $S_1$, $S_2$ and $S_3$ are impressed with digital data.

11. The method of claim 7, wherein said first, second, and third signal waves $S_1$, $S_2$, and $S_3$ are impressed with analog data.

* * * * *